United States Patent
Tseng (10) Patent No.: US 11,901,669 B2
(45) Date of Patent: Feb. 13, 2024

(54) CONNECTOR SHROUD

(71) Applicant: ACSUPER TECHNOLOGIES INC, Myau-Li County (TW)

(72) Inventor: Chung-Ming Tseng, Myau-Li County (TW)

(73) Assignee: ACSUPER TECHNOLOGIES INC, Myau-Li County (TW)

( * ) Notice: Subject to any disclaimer, the term of this patent is extended or adjusted under 35 U.S.C. 154(b) by 64 days.

(21) Appl. No.: 17/852,415

(22) Filed: Jun. 29, 2022

(65) Prior Publication Data

US 2023/0049888 A1    Feb. 16, 2023

Related U.S. Application Data

(60) Provisional application No. 63/233,337, filed on Aug. 16, 2021.

(51) Int. Cl.
*H01R 13/622* (2006.01)
*H01R 13/629* (2006.01)

(52) U.S. Cl.
CPC ..... *H01R 13/622* (2013.01); *H01R 13/62905* (2013.01)

(58) Field of Classification Search
CPC ............ H01R 13/622; H01R 13/62905; G02B 6/3891
See application file for complete search history.

(56) References Cited

U.S. PATENT DOCUMENTS

| | | | |
|---|---|---|---|
| 8,942,532 B2 | 1/2015 | Greub et al. | |
| 9,122,021 B2 | 9/2015 | Elenbaas et al. | |
| 9,755,382 B2 * | 9/2017 | Gniadek | H01R 13/64 |
| 10,649,152 B1 | 5/2020 | Yang | |
| 11,204,472 B1 | 12/2021 | Tseng | |
| 2020/0116957 A1 | 4/2020 | Takano et al. | |
| 2020/0266580 A1 * | 8/2020 | Krome | H01R 13/635 |

* cited by examiner

*Primary Examiner* — Travis S Chambers
(74) *Attorney, Agent, or Firm* — WPAT, PC (57) ABSTRACT

The connector shroud of the present invention includes an inner housing, a cam, a coupling nut and a lock nut. The inner housing has a grooved control link formed on an outer surface. The grooved control link extends in a longitudinal direction. The cam is disposed on the inner housing and is rotatable on the inner housing. The coupling nut is sleeved onto the inner housing. The coupling nut is configured to be coupled to an object. The coupling nut includes a tab extending from a rear end. The tab has a control slot formed thereon. The control slot extends in a direction not parallel to the longitudinal direction. The lock nut is sleeved onto the inner housing and includes a first pin and a second pin formed on an inner surface. The first pin is movable in the grooved control link and the second pin is movable in the control slot. When the second pin is in the control slot, a movement of the lock nut causes the coupling nut to rotate. When the first pin moves in the grooved control link in the longitudinal direction, the lock nut contacts the cam to make the cam rotate. The rotating cam applies a force perpendicular to the longitudinal direction to the tab to rotate the coupling nut.

8 Claims, 13 Drawing Sheets

CONNECTOR SHROUD

RELATED APPLICATION

The present application claims priority to U.S. Provisional Application Ser. No. 63/233,337, filed on Aug. 16, 2021, the disclosure of which is hereby incorporated by reference herein in their entirety.

BACKGROUND

1. Technical Field

This invention generally relates to a connector shroud, more particularly, to an optical fiber connector weather shroud.

2. Description of the Related Art

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption.

Figure 1:
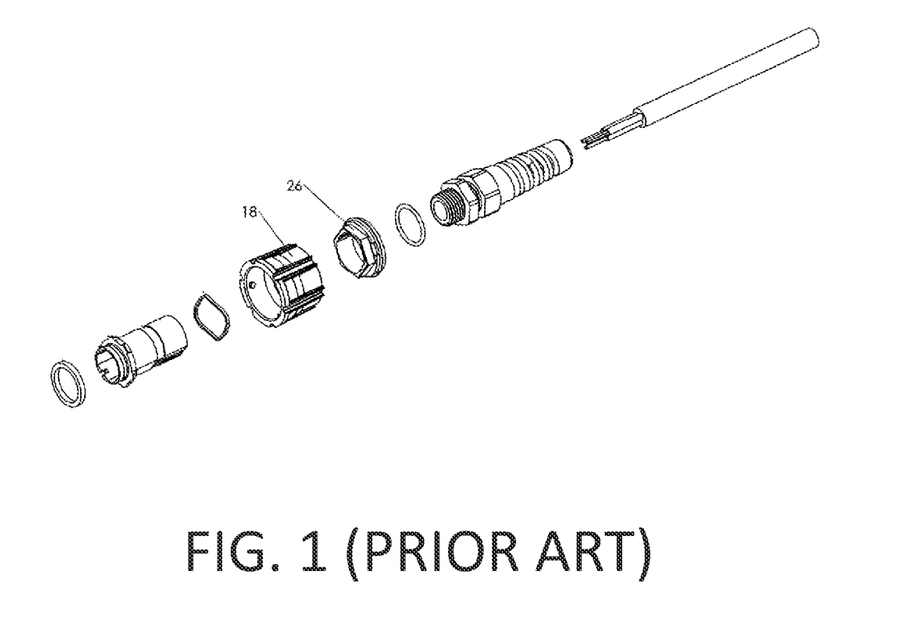
FIG. 1 illustrates a conventional connector system.

Referring to FIG. 1, a connector system for optical fibers and electrical conductors is disclosed in U.S. Pat. No. 9,755,382. The main feature of the design is that after the coupling nut 18 has been twisted into a closed position, it can be locked in place by the lock ring 26. The above-mentioned locking method is to twist the coupling nut 18 clockwise and then push the lock ring 26 forward to press against the coupling nut 18 to prevent the coupling nut 18 from rotating. To unlock, the lock ring 26 is pulled backward and the coupling nut 18 is twisted counterclockwise. It should be noted that if the operator forgets to push up the lock ring 26 after locking the coupling nut 18, the coupling nut 18 cannot be ensured to remain in the closed position.

Further, the above design has the disadvantage of that the locking and unlocking motions require sufficient clearance for the operator to grip and twist the connector. Since it is necessary to leave space for the operator's hands to manipulate the connector, it is not possible for connectors to be installed side-by-side close to one another. This limits the density of connectors that can be installed in a panel and requires larger spacing between connectors on the panel.

SUMMARY

In view of the above, the present invention provides a connector shroud that the locking and unlocking of the connector shroud can be implemented by an operator with only one hand.

The connector shroud of the present invention includes an inner housing, a cam, a coupling nut and a lock nut. The inner housing has a grooved control link formed on an outer surface. The grooved control link extends in a longitudinal direction. The cam is disposed on the inner housing and is rotatable on the inner housing. The coupling nut is sleeved onto the inner housing. The coupling nut is configured to be coupled to an object. The coupling nut includes a tab extending from a rear end. The tab has a control slot formed thereon. The control slot extends in a direction not parallel to the longitudinal direction. The lock nut is sleeved onto the inner housing and includes a first pin and a second pin formed on an inner surface. The first pin is movable in the grooved control link and the second pin is movable in the control slot. When the second pin is in the control slot, a movement of the lock nut causes the coupling nut to rotate. When the first pin moves in the grooved control link in the longitudinal direction, the lock nut contacts the cam to make the cam rotate. The rotating cam applies a force perpendicular to the longitudinal direction to the tab to rotate the coupling nut.

According to the connector shroud of the present invention, a user may move the lock nut longitudinally to rotate the coupling nut without need of directly twisting the coupling nut. In this way there is no need to vacate the space beside the coupling nut for the user to twist the coupling nut. Therefore, the installation density of the connectors can be improved.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 2:
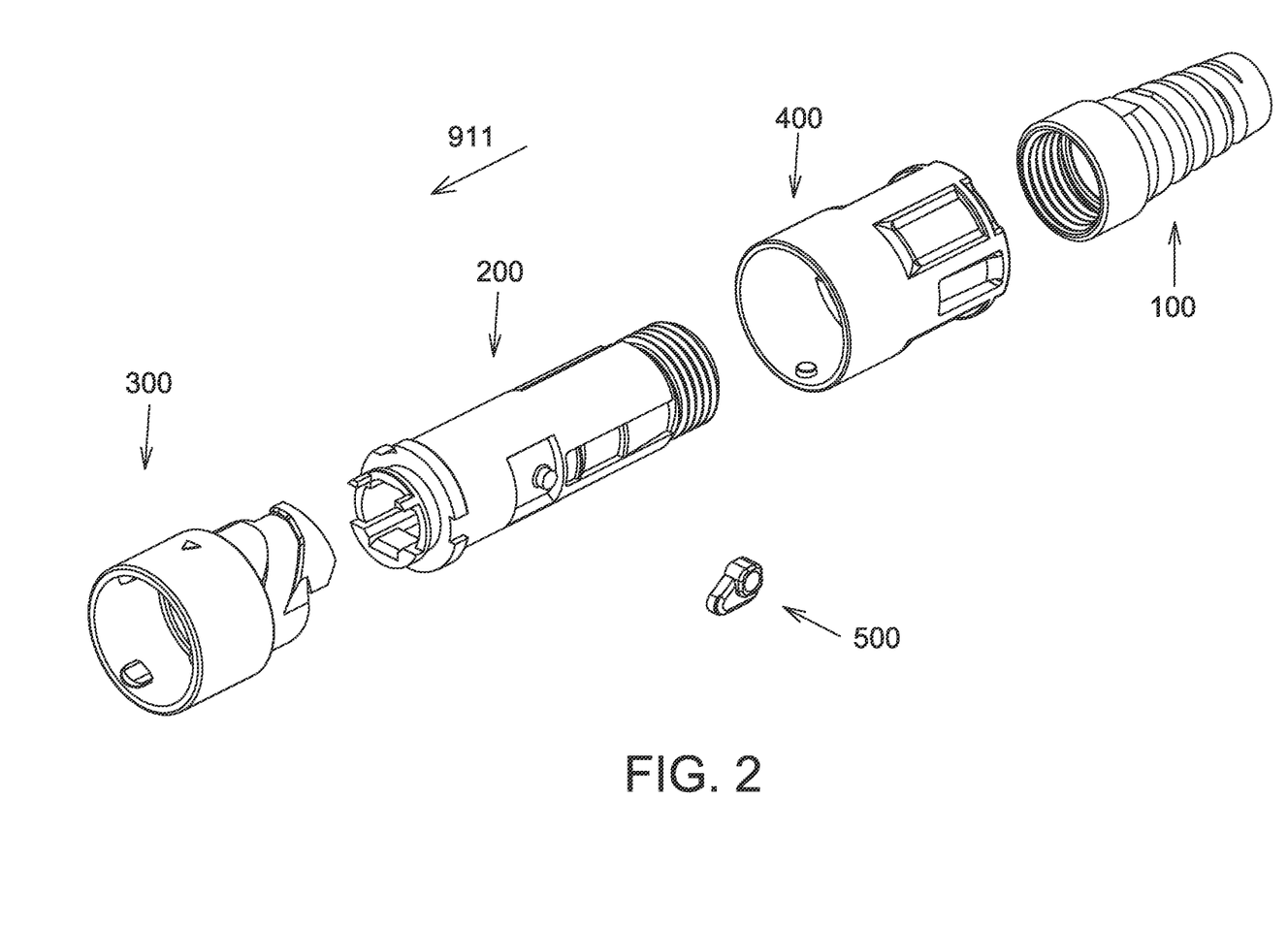
FIG. 2 is an exploded view of the connector shroud according to the present invention.

Referring to FIG. 2, which is an exploded view of the connector shroud according to the present invention. As shown in the figure, the connector shroud includes a cable gland 100, an inner housing 200, a coupling nut 300, a lock nut 400 and a cam 500. The cable gland 100, the inner housing 200, the coupling nut 300, the lock nut 400 and the cam 500 may be constructed of plastics by an injection molding process.

The cable gland 100 may be made from a flexible material and provide strain relief on cable (not shown) using materials and attachment techniques as are known in the art. The cable gland 100 has a hollow body whose lengthwise direction is parallel to a longitudinal direction 911. The cable gland 100 has a thread formed on inner surfaces of the front end for being coupled to the inner housing 200.

Figure 3A:
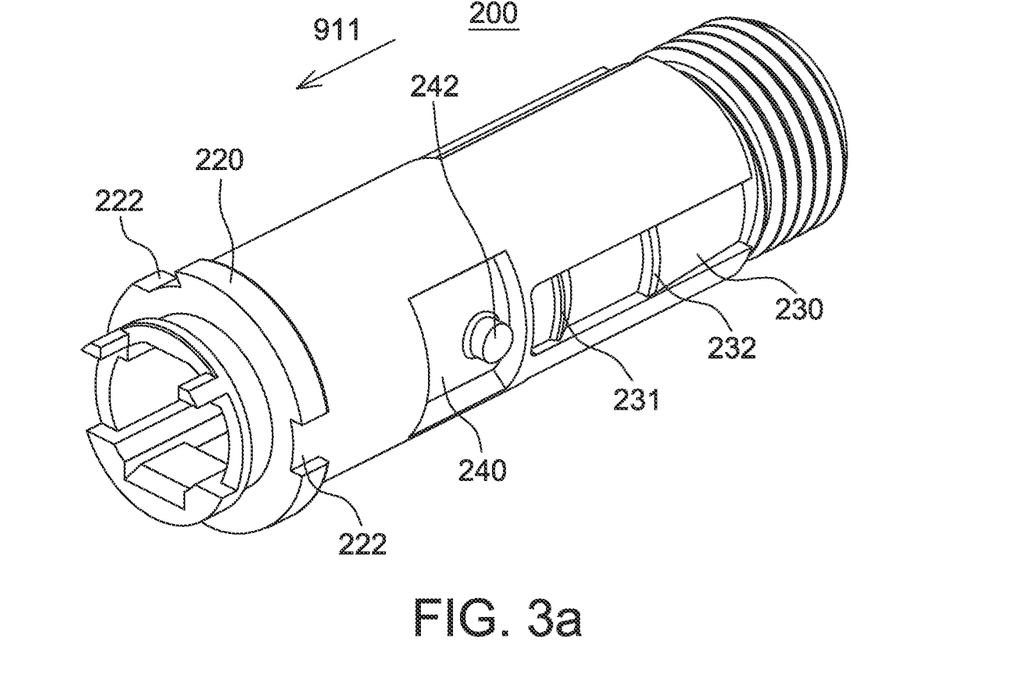
FIGS. 3a and 3b are different elevated perspective views of the inner housing of the connector shroud according to the present invention.
Figure 3B:
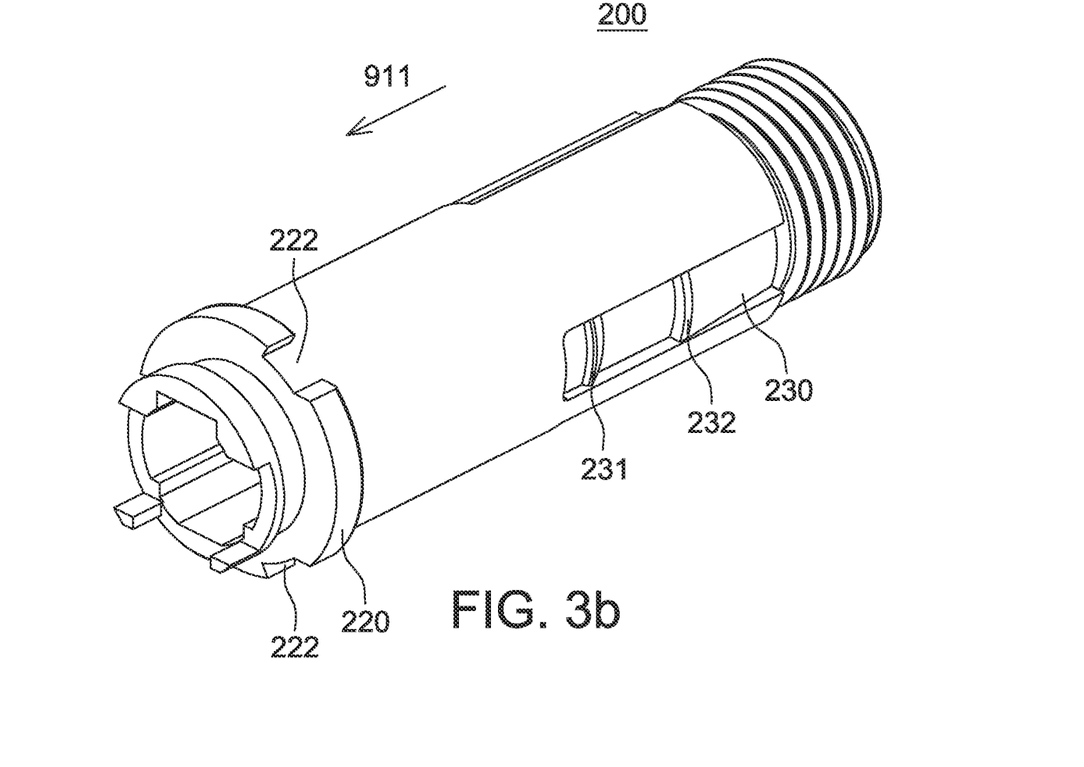

Referring to FIGS. 3a and 3b, the inner housing 200 is hollow and has a cylindrical body whose lengthwise direction is parallel to the longitudinal direction 911. An annular groove is formed at the front section of the outer surface of the inner housing 200 for receiving a sealing ring (not shown). An annular protrusion 220 located behind the annular groove is formed on the outer surface of the inner housing 200, the annular surface of which is perpendicular to the longitudinal direction 911. Three notches 222 are formed in the protrusion 220 and are arranged at equal intervals. Two identical grooved control links 230 are arranged on the outer surface of the inner housing 200 on two opposite sides and extend in the longitudinal direction 911. Two bumps 231, 232 are formed on the bottom of each of the grooved control links 230, wherein the bump 231 is located closer to the protrusion 220 than the bump 232. In addition, a cam groove 240 is formed on the outer surface of the inner housing 200. The cam groove 240 is a rectangular groove and a column 242 is formed at the bottom of the cam groove 240.

Figure 4A:
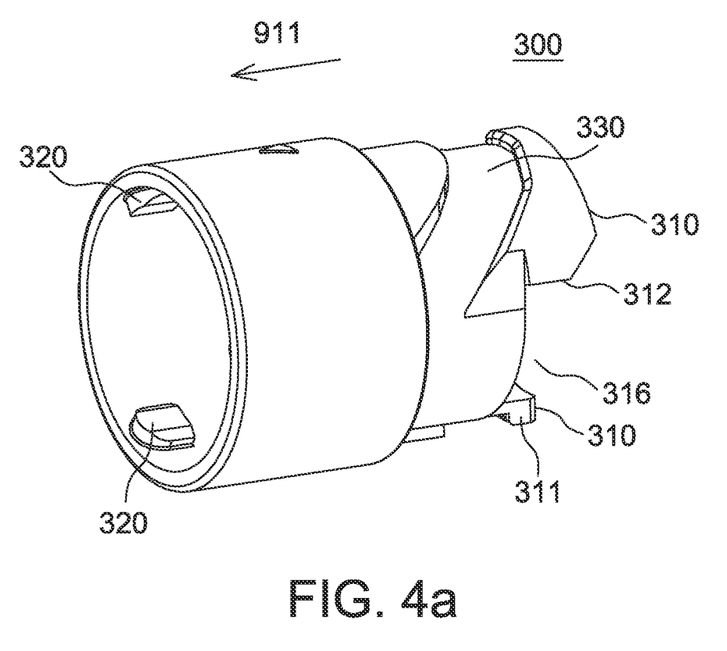
FIGS. 4a and 4b are different elevated perspective views of the coupling nut of the connector shroud according to the present invention.
Figure 4B:
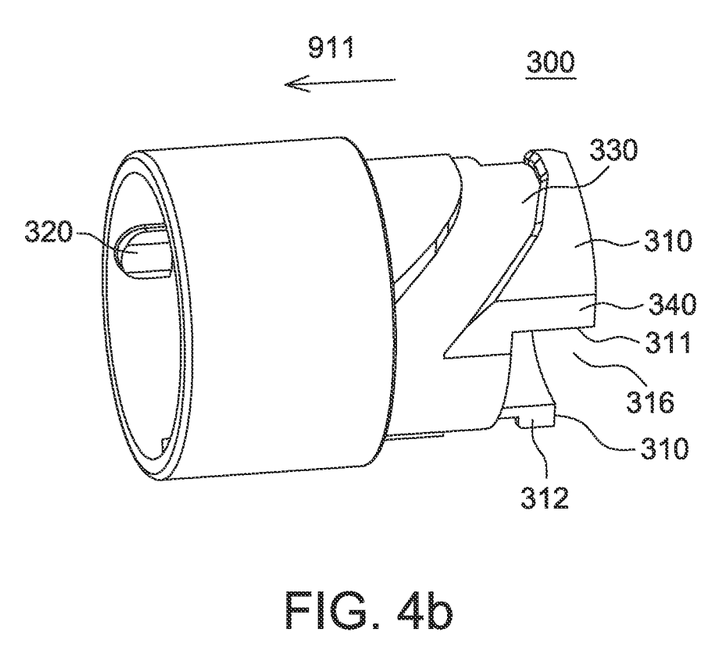

Referring to FIGS. 4a and 4b, the coupling nut 300 is hollow and has a cylindrical body for being sleeved onto the inner housing 200. A plurality of pins 320 arranged at equal intervals is formed on the inner surface of the front end of the coupling nut 300. Two mutually opposite tabs 310 with an arc-shaped cross-section protrude from the rear end of the coupling nut 300. Each of the tabs 310 has two opposite side surfaces 311 and 312, respectively facing the side surfaces 312 and 311 of the other tab 310 across a gap 316. Two identical and mutually opposite control slots 330 are respectively formed on the tabs 310. The control slot 330 extends from the rear end of the tab 310 toward the front end of the coupling nut 300 in a direction not parallel and not perpendicular to the longitudinal direction 911. In addition, an inclined surface 340 is formed on one of the tabs 310 and is adjacent to the side surface 311 and the control slot 330 on the tab 310.

Figure 5A:
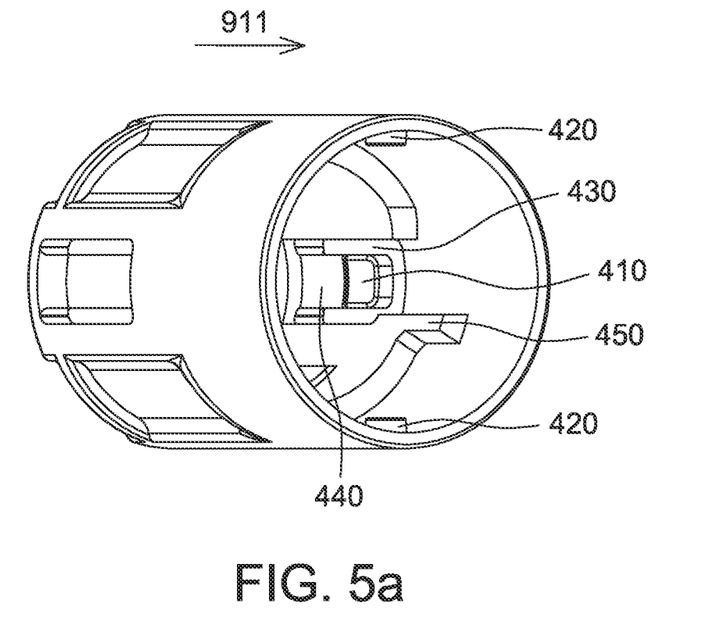
FIGS. 5a and 5b are different elevated perspective views of the lock nut of the connector shroud according to the present invention.
Figure 5B:
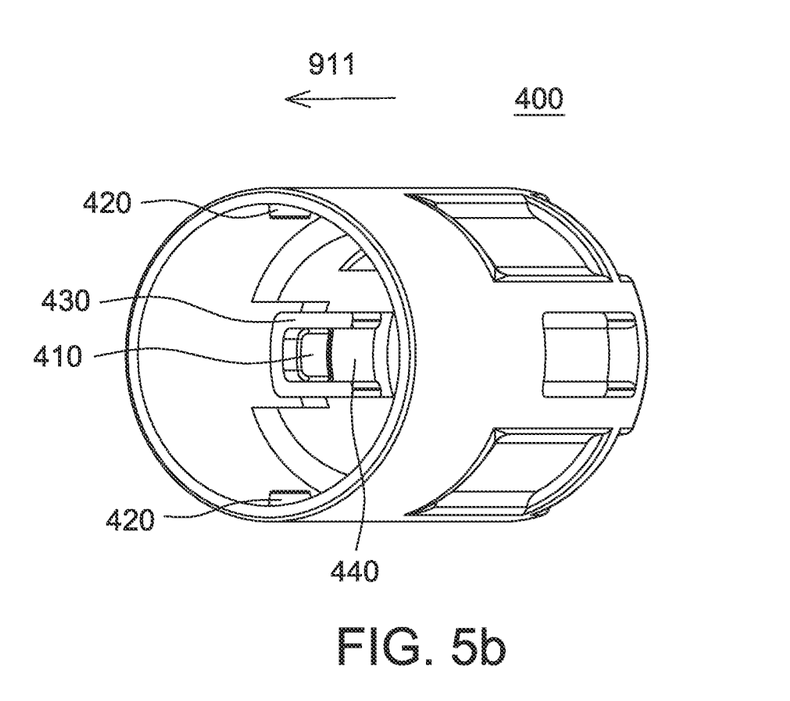

Referring to FIGS. 5a and 5b, the lock nut 400 is hollow and has a cylindrical body for being sleeved onto the inner housing 200 and covering the tabs 310 of the coupling nut 300. Two mutually opposite second pins 420 are formed at the front section of the inner surface of the lock nut 400. Two mutually opposite first pins 410 are formed on the inner surface of the lock nut 400. In another embodiment, two mutually opposite openings 430 are formed on the lateral surface of the lock nut 400 and two cantilevers 440 are provided respectively in the openings 430. The cantilevers 440 extend from the lateral surface of the lock nut 400 and have a lengthwise direction parallel to the longitudinal direction 911. The two first pins 410 are respectively coupled to the front sections of the two cantilevers 440. In addition, an elongated extension 450 extending in the longitudinal direction 911 is formed on the inner surface of the lock nut 400.

Figure 6A:
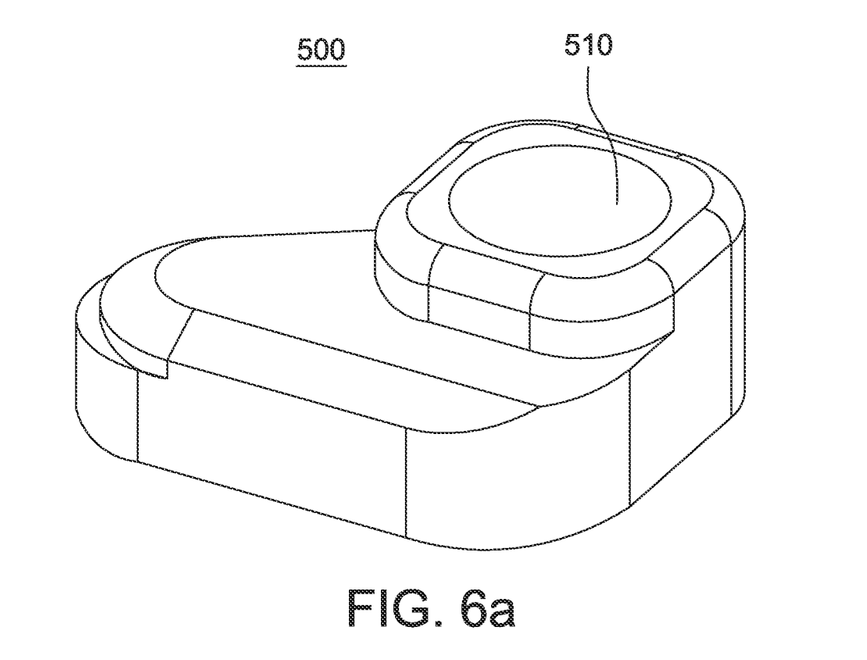
FIGS. 6a and 6b are different elevated perspective views of the cam of the connector shroud according to the present invention.
Figure 6B:
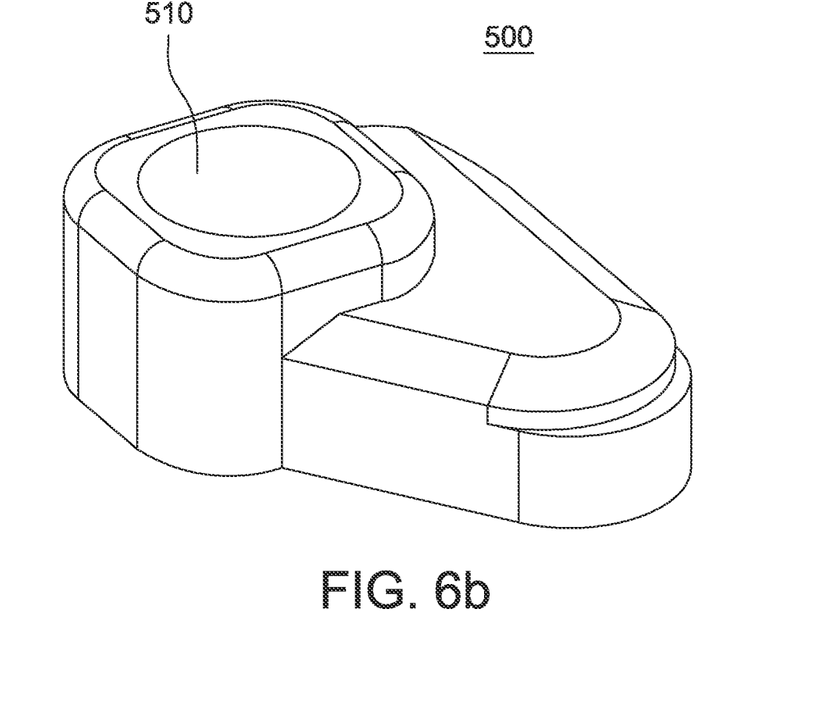

Referring to FIGS. 6a and 6b, the cam 500 has a substantially triangular shape and a circular opening 510 is formed thereon for accommodating the column 242 on the inner housing 200. The center of gravity of the cam 500 is designed not to fall within the opening 510. The cam 500 is used to be placed in the cam groove 240 on the inner housing 200 and allows the column 242 to be received in the opening 510.

Figure 7A:
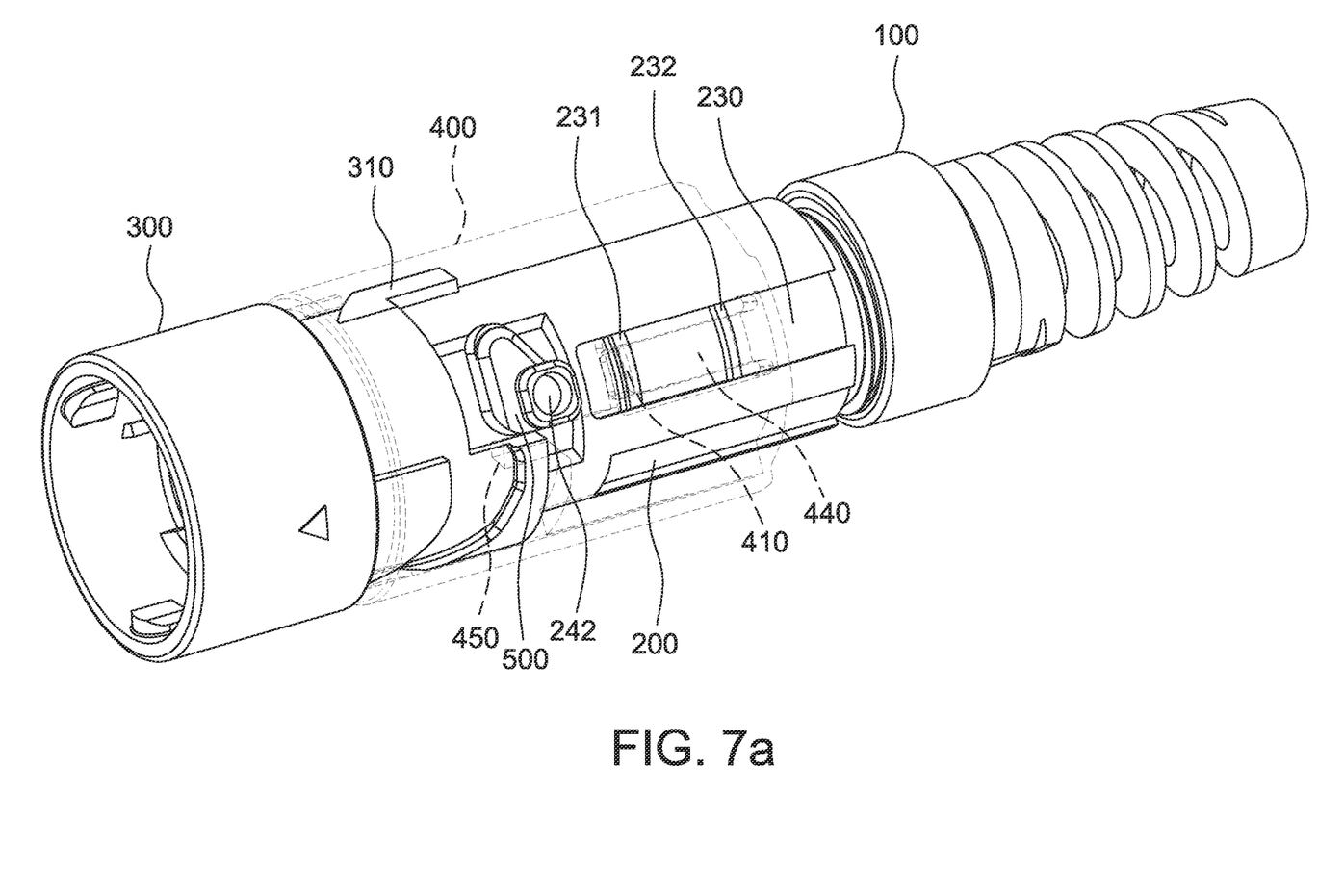
FIGS. 7a, 7b and 7c are different elevated perspective views of the connector shroud according to the present invention.
Figure 7B:
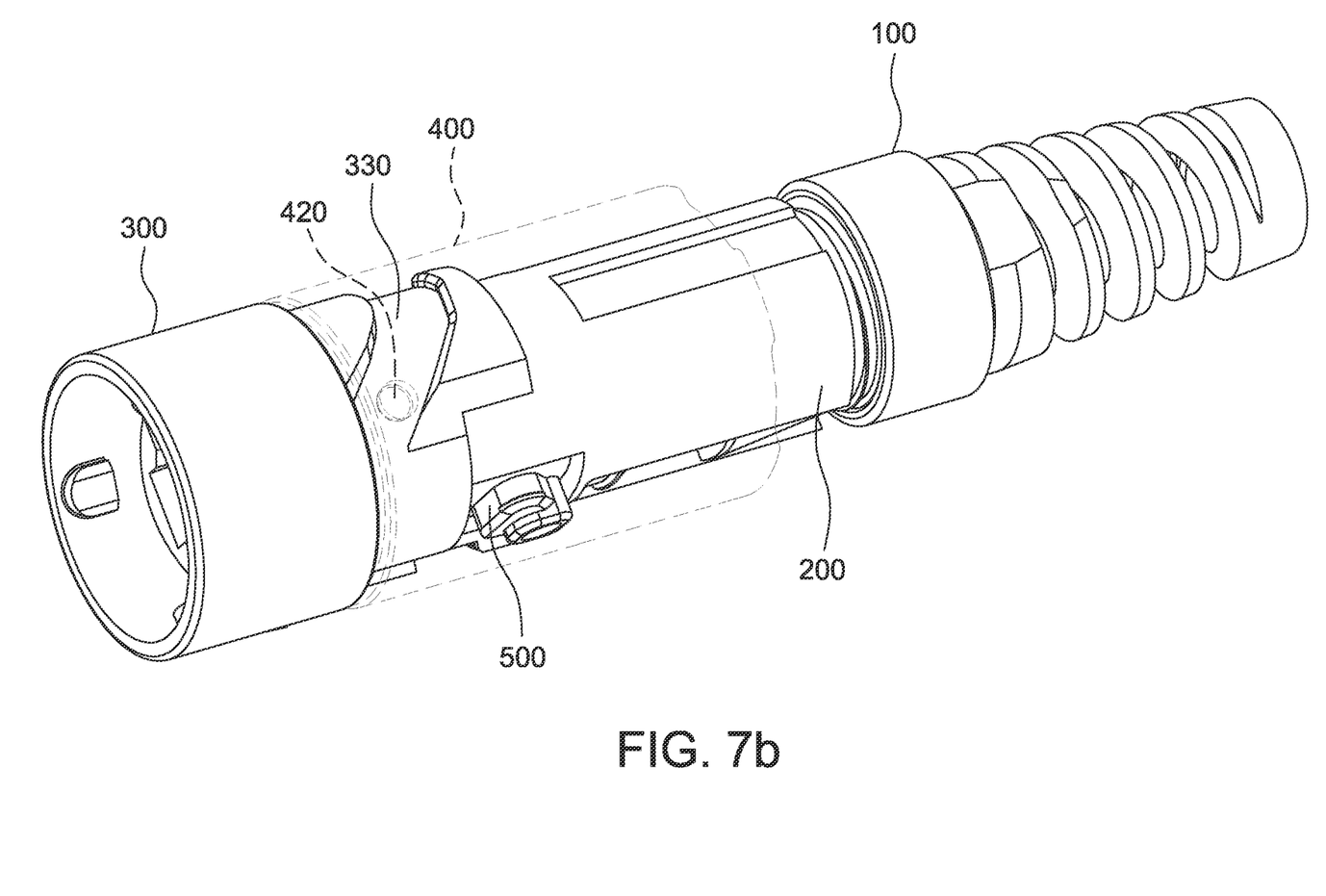
Figure 7C:
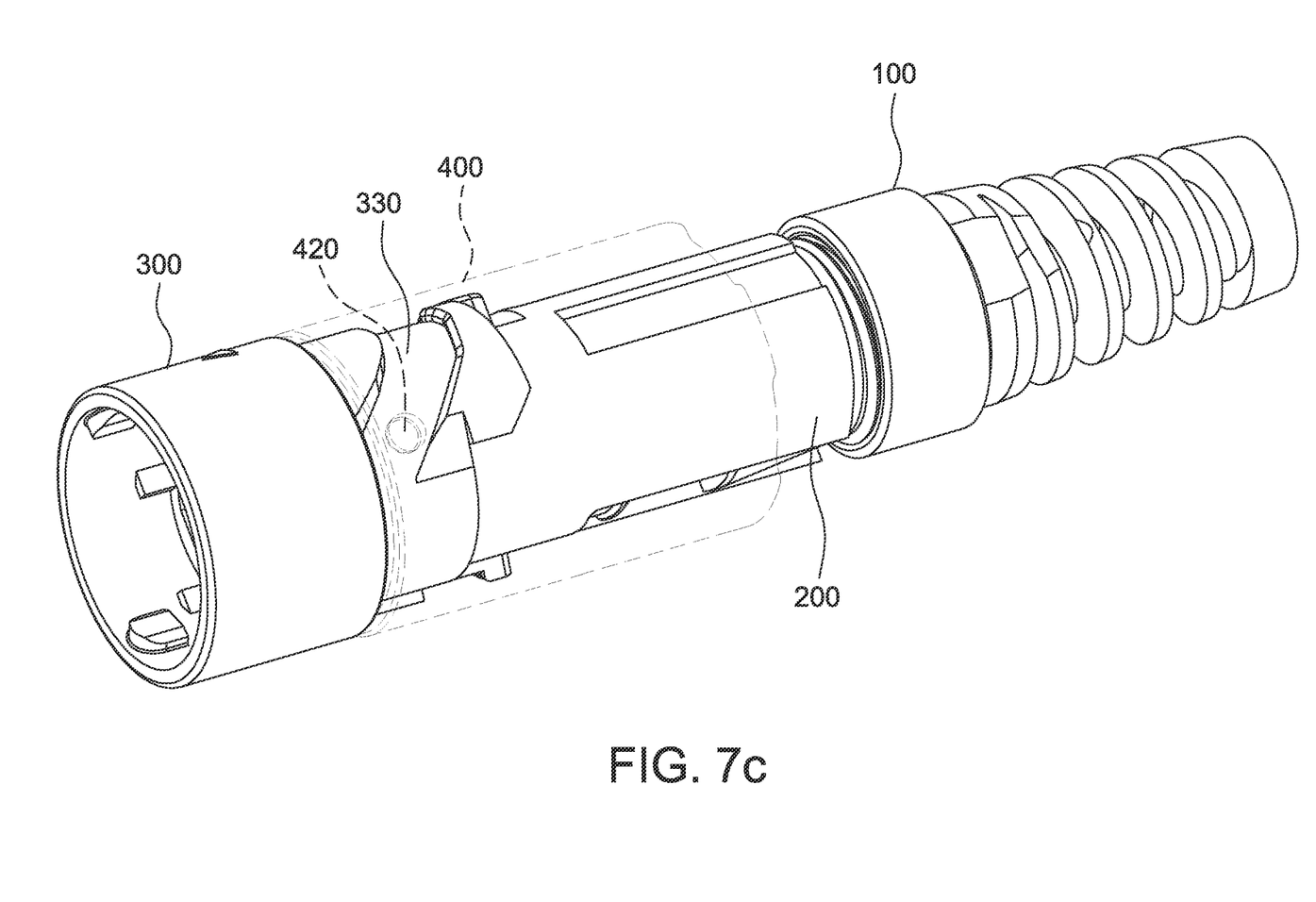

Referring to FIGS. 7a, 7b and 7c, which are three elevated perspective views illustrating the connector shroud of the present invention. The rear end of the inner housing 200 is coupled to the front end of the cable gland 100. The cam 500 is disposed in the cam groove 240 on the inner housing 200 and the column 242 is inserted into the opening 510. The cam 500 is pivotally connected to the column 242 and the column 242 serves as a rotation axis so that the cam 500 is able to rotate about the column 242. The coupling nut 300 is sleeved onto the front section of the inner housing 200. The lock nut 400 is sleeved onto the middle section of the inner casing 200 and covers the cam 500 and the tabs 310 of the coupling nut 300. The two first pins 410 on the inner surface of the lock nut 400 are respectively located in the two grooved control links 230 on the inner housing 200. The two second pins 420 on the inner surface of the lock nut 400 are respectively arranged in the two control slots 330 on the coupling nut 300. The connectors to be shielded are arranged in the inner housing 200 (not shown).

Figure 8:
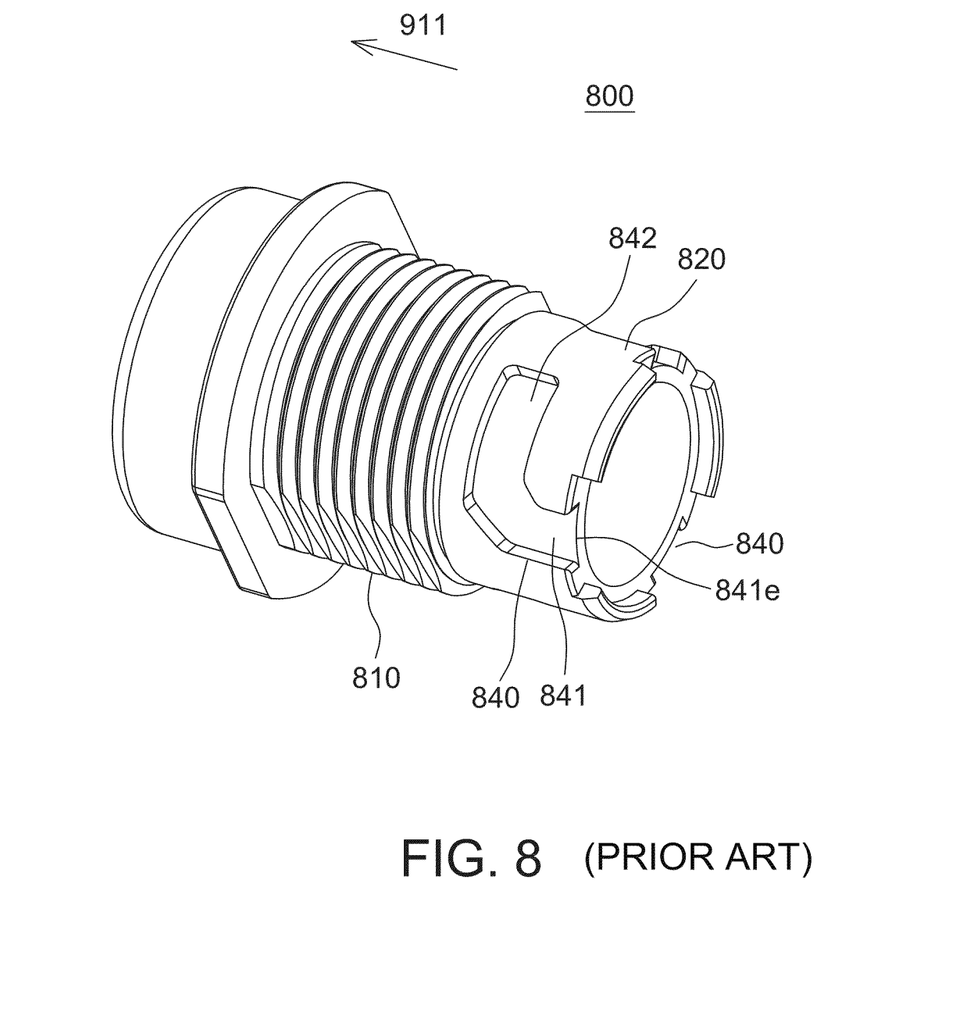
FIG. 8 is an elevated perspective view of a conventional adapter.

FIG. 8 shows a conventional adapter 800, which is provided on an apparatus so that the connectors provided in the apparatus may be coupled to other connectors. The adapter 800 includes a hollow cylinder 820 having a thread 810 formed thereon so that the adapter 800 may be secured to the apparatus with a nut. The adapter 800 is further provided with a plurality of grooves 840 formed on the cylinder 820, each of which includes a guiding groove portion 841 and a retaining groove portion 842. The guiding groove portion 841 extends both axially and circumferentially, e.g., generally spirally, about at least a portion of the wall of the cylinder 820, e.g., along and about the longitudinal direction 911, respectively. The guiding groove portion 841 has an entrance 841e at its distal end at the rear of the cylinder 820 to receive a protruding member, e.g., the pin 320. The retaining groove portion 842 joins the guiding groove portion 841 for receiving a protruding member, e.g., the pin 320. The retaining groove portion 842 extends generally in a circumferential direction about the longitudinal direction 911.

Figure 9:
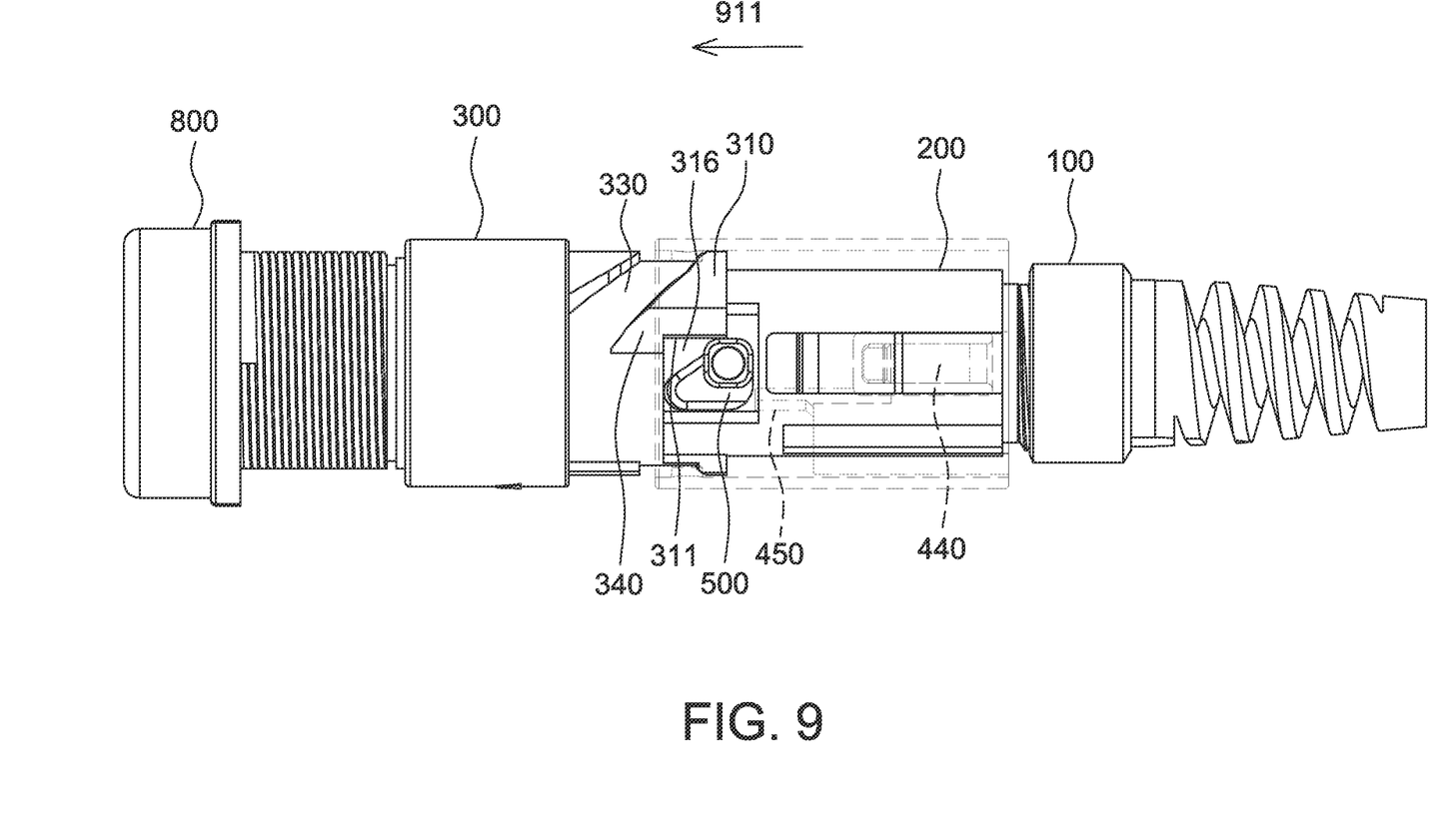
FIGS. 9, 10 and 11 illustrate how to use the connector shroud of the present invention.
Figure 10:
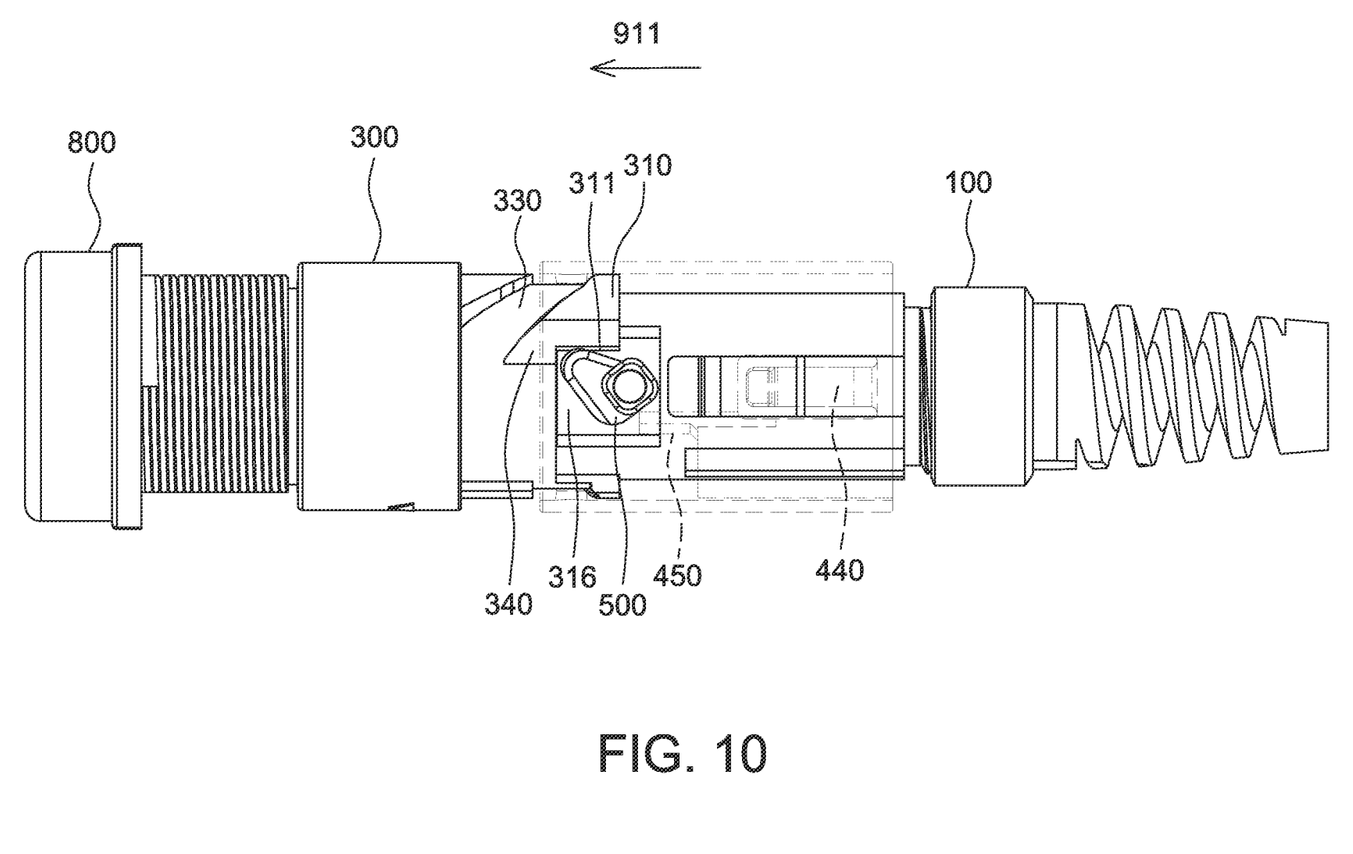
Figure 11:
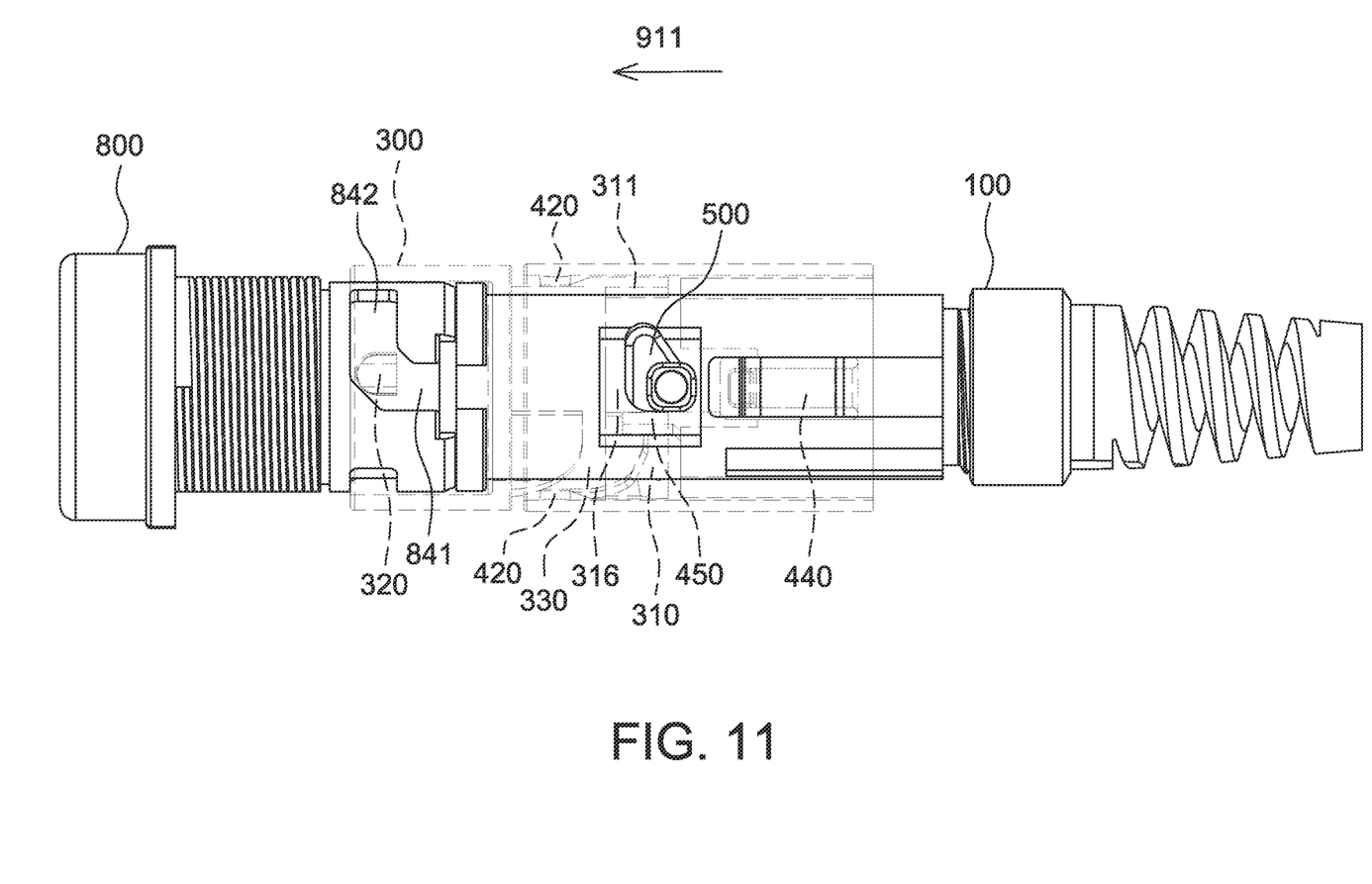

Referring to FIGS. 9, 10 and 11, the connector shroud of the present invention may be mated with an object, such as the adapter 800 of FIG. 8, so that the connectors provided in the connector shroud may be coupled with the connectors provided in the adapter 800 (not shown). To mate with the adapter 800, the front end of the inner housing 200 of the connector shroud is inserted into the cylinder 820 of the adapter 800 such that the pins 320 on the inner surface of the coupling nut 300 respectively enter the guiding groove portions 841 from the entrances 841e. Afterward the coupling nut 300 is twisted to allow the pins 320 to slide from the guiding groove portions 841 into the retaining groove portions 842 respectively. The coupling nut 300 is now coupled to the adapter 800 and the connector shroud is mated with the adapter 800. During the rotation of the coupling nut 300, the inner housing 200 is restricted and therefore cannot be rotated. If it is desired to detach the connector shroud from the adapter 800, the coupling nut 300 is twisted in the opposite direction to allow the pins 320 to slide out of the grooves 840 from the entrances 841e. In other embodiments, the coupling nut 300 is not limited to be coupled to the adapter 800, and may be designed to be coupled to other objects.

Referring back to FIG. 7a, the two first pins 410 of the lock nut 400 may respectively move forward or backward in the grooved control links 230 on the inner housing 200. When a user moves the lock nut 400 to cause the first pins 410 to pass over the bumps 231 respectively, the user will feel a change in resistance. This change in resistance provides the user with tactile feedback.

In the connector shroud of the present invention, the two second pins 420 of the lock nut 400 may move respectively in the two control slots 330 of the coupling nut 300. When the lock nut 400 is pushed forward, the coupling nut 300 will rotate clockwise to be locked on the adapter 800. If it is desired to unlock the coupling nut 300, pulling the lock nut 400 backward causes the coupling nut 300 to rotate counterclockwise to be unlocked from the adapter 800.

Referring back to FIGS. 9, 10 and 11, the cam 500 is located in the gap 316 between the tabs 310. When the lock nut 400 is pushed toward the adapter 800, its extension 450 will be in contact with the cam 500 as shown in FIG. 9. Afterward the cam 500 is pushed to rotate around the column 242 on the inner housing 200 as shown in FIG. 10. Subsequently, the cam 500 continues to rotate and press against the inclined surface 340 on the tab 310, thus a force perpendicular to the longitudinal direction 911 is applied to the coupling nut 300. This force causes the coupling nut 300 to rotate clockwise to help it lock on the adapter 800 as shown in FIG. 11.

In the connector shroud of the present invention, moving the lock nut 400 forward causes the cam 500 to rotate the coupling nut 300 so that the coupling nut 300 may be locked more easily. In addition, the cam 500 is designed such that its center of gravity does not fall within the column 242 and the tilting of the connector shroud allows the cam 500 to rotate back to its initial position.

According to the connector shroud of the present invention, a user may move the lock nut 400 longitudinally to rotate the coupling nut 300 without need of directly twisting the coupling nut 300. In this way there is no need to vacate the space beside the coupling nut 300 for the user to twist the coupling nut 300. Therefore, the installation density of the connectors can be improved.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A connector shroud, comprising:
    an inner housing having a grooved control link formed on an outer surface, the grooved control link extending in a longitudinal direction;
    a cam disposed on the inner housing, the cam being rotatable on the inner housing;
    a coupling nut sleeved onto the inner housing, the coupling nut being configured to be coupled to an object, the coupling nut comprising a tab extending from a rear end, the tab having a control slot formed thereon, the control slot extending in a direction not parallel to the longitudinal direction; and
    a lock nut sleeved onto the inner housing, the lock nut comprising a first pin and a second pin formed on an inner surface, the first pin being movable in the grooved control link and the second pin being movable in the control slot, wherein
    when the second pin is in the control slot, a movement of the lock nut causes the coupling nut to rotate,
    when the first pin moves in the grooved control link in the longitudinal direction, the lock nut contacts the cam to make the cam rotate, and
    the rotating cam applies a force perpendicular to the longitudinal direction to the tab to rotate the coupling nut.

2. The connector shroud as claimed in claim 1, wherein the lock nut further comprises an extension extending in the longitudinal direction formed on the inner surface, the extension be configured to contact the cam to make the cam rotate.

3. The connector shroud as claimed in claim 1, wherein the lock nut further comprises a cantilever extending in the longitudinal direction in an opening, the first pin being disposed on the cantilever.

4. The connector shroud as claimed in claim 1, wherein the inner housing comprises a bump formed in the grooved control link to provide a tactile feedback when the lock nut is moved to cause the first pin to pass over the bump.

5. The connector shroud as claimed in claim 1, wherein the inner housing comprises a column formed thereon, the cam being pivotally connected to the column so that the cam is rotatable about the column.

6. The connector shroud as claimed in claim 5, wherein the cam has a center of gravity not falling within the column.

7. The connector shroud as claimed in claim 1, wherein the inner housing comprises a column formed in a cam groove, the cam being disposed in the cam groove and pivotally connected to the column so that the cam is rotatable about the column.

8. The connector shroud as claimed in claim 7, wherein the cam has a center of gravity not falling within the column.

* * * * *